United States Patent [19]

Deets

[11] 4,115,353

[45] Sep. 19, 1978

[54] NITROGENOUS POLYMER COMPOSITION EMITTING REDUCED AMOUNTS OF HYDROGEN CYANIDE ON COMBUSTION

[75] Inventor: Gary L. Deets, Springfield, Mass.

[73] Assignee: Monsanto Company, St. Louis, Mo.

[21] Appl. No.: 817,941

[22] Filed: Jul. 22, 1977

[51] Int. Cl.² .............................................. C08K 3/26
[52] U.S. Cl. ......................... 260/45.75 C; 260/880 R; 526/4
[58] Field of Search ............. 526/4; 260/37 N, 42.48, 260/45.75 C, 45.7 R

[56] References Cited

U.S. PATENT DOCUMENTS

| | | |
|---|---|---|
| 3,549,564 | 12/1970 | Parker ........................... 260/2.5 AJ |
| 3,639,518 | 2/1972 | Davies ........................... 260/45.7 R |
| 3,697,456 | 10/1972 | Pitts ............................... 260/45.75 C |
| 3,821,151 | 6/1974 | Mitchell ........................ 260/45.75 C |
| 3,826,764 | 7/1974 | Weber ........................... 260/2.5 AJ |
| 4,008,368 | 2/1977 | Leuchs .......................... 260/42.49 |
| 4,053,451 | 10/1977 | Kroenke ....................... 260/45.75 C |

*Primary Examiner*—Paul R. Michl
*Attorney, Agent, or Firm*—David Bennett; W. J. Farrington; J. C. Logomasini

[57] ABSTRACT

Polymer compositions comprising a nitrogenous polymer, especially an acrylonitrile-containing polymer evolve reduced amounts of hydrogen cyanide on combustion when containing an alkali metal carbonate and cupric oxide.

5 Claims, No Drawings

NITROGENOUS POLYMER COMPOSITION EMITTING REDUCED AMOUNTS OF HYDROGEN CYANIDE ON COMBUSTION

This invention relates to a method for reducing the amount of noxious gas evolved during the combustion of a nitrogenous polymer.

It is known that when nitrogenous polymers are burned the combustion products are often found to comprise hydrogen cyanide. In view of the known toxicity of this gas it is desirable that the amount of any such gas released when these polymers burn be minimized.

It has now been discovered that the amount of hydrogen cyanide gas evolved during high temperature decomposition of nitrogenous polymers can be controlled by the use of a blend of certain additives.

SUMMARY OF THE INVENTION

The present invention provides a polymer composition comprising a nitrogenous polymer and from 1 to 10 percent by weight, based on the polymer, of an alkali metal carbonate and from 1 to 10 percent by weight, based on the polymer, of cupric oxide.

The nitrogenous polymer is understood to be a polymer containing nitrogen such as for example polyamides, polyimides, melamine/formaldehyde, urea/formaldehyde, polyurethanes and acrylonitrile polymers (including copolymers). It is found that the additive combination is particularly suitable for use with the polymers containing nitrile monomers such as styrene/acrylonitrile polymers and acrylonitrile/butadiene/styrene including variations such as substitution of methacrylonitrile, chloroprene for butadiene and chlorostyrene for styrene.

The alkali metal carbonate component may be for example the carbonate of sodium, potassium, rubidium or caesium but the preferred alkali metal carbonate is potassium carbonate. The carbonate component may also be effective in reducing the hydrogen halide content of the emissions where the polymer composition contains a halogen containing component.

The amount of the alkali metal carbonate used can be from 1 to 10 percent by weight based on the polymer weight but is generally between 2 and 8 percent. About 2 to 5 percent by weight gives very good results. Likewise, the amount of cupric oxide employed falls in the range 1 to 10 percent by weight based on the polymer weight with from 2 to 8 percent, and especially from about 2 to 5 percent by weight, being preferred. Usually equal amounts of the carbonate and the cupric oxide give satisfactory results.

The polymer composition may additionally comprise additives such as antioxidants, stabilizers of various sorts, fillers and flame retardants. It is however found that the use of a large amount of a halogen-containing flame retardant results in a reduced efficiency from the point of view of HCN emission reduction, possibly because one or both components are used up in reacting with the hydrogen halide. It is therefore advisable when the polymer compositions of the invention comprise a halogen-containing flame-retardant, that the quantities of additives be adjusted to give a balance of the desired properties.

DESCRIPTION OF THE PREFERRED EMBODIMENTS

The examples which follow demonstrate the effectiveness of the compositions of the invention. The important measurements of gas evolved on burning are made using an NBS smoke test chamber. This is a closed chamber adapted to permit two kinds of combustion, smoldering and flaming. Gases evolved are sampled and analyzed. The actual measurement of the amount of HCN evolved is not considered to be a part of this invention. In this regard, any method capable of detecting amounts of HCN as low as one part per million can be used to measure the amount of evolved HCN. These methods which are well known to those skilled in the art, include colorimetric measurements, polargraphic measurements, gas chromatographic measurements and electrochemical measurements. The results are expressed in parts per million by volume per 10 grams burned (ppmv/10 g).

The NBS Smoke Test Chamber is fully described in ASTM Special Technical Publication 422, page 174.

EXAMPLE

This Example demonstrates the effectiveness under both flaming and smoldering conditions of a composition of the invention and demonstrates the synergistic effect obtained using the combination by comparison over either component alone.

In each case the base polymer is a copolymer of styrene and acrylonitrile polymerized in the presence of a polybutadiene rubber. The polymer comprises 30 percent by weight of acrylonitrile which is present either in the form of superstrate grafted on the butadiene rubber or as matrix polymer.

The results obtained are set forth in Table I.

TABLE I

Summary of the results obtained when the polymer is tested for evolution of HCN under flaming combustion conditions:

| Ex. | Additive | Wt. % of Additives | ppmv/10g. HCN | % Reduction[1] in HCN |
|---|---|---|---|---|
| C1 | None | — | 120 | — |
| C2 | $K_2CO_3$ | 5 | 140 | (−16) |
| C3 | CuO | 5 | 100 | 16 |
| 1 | $K_2CO_3$ + CuO | 2.5/2.5 | 60 | 50 |

[1] over the HCN evolved in the absence of any additive.
C1 - C3 are comparative examples.

It can clearly be seen from the above that the present invention has an effectiveness that is beyond the mere sum of the effectiveness of the individual components and that therefore a genuine synergistic effect is in operation.

The polymers of the present invention are useful for preparing a wide variety of molded objects such as radio and televison cabinets, appliance housings, parts and components for vehicles, furniture and other related items.

Polymers of the present invention may be further modified with conventional additives and adjuvants such as fillers, plasticizers, U.V. stabilizers, heat stabilizers, antioxidants, etc. Care should be taken when formulating or compounding the polymers of the present invention so as not to affect adversely the toxic gas-supporting properties of the compositions of the present invention.

What is claimed:

1. A polymer composition comprising a styrene/acrylonitrile copolymer comprising from 10 to 90 percent of acrylonitrile and from 1 to 10 percent by weight, based on the polymer weight, of an alkali metal carbonate selected from the group consisting of sodium carbonate and potassium carbonate and from 1 to 10 percent by weight of cupric oxide.

2. The polymer composition of claim 1 in which the polymer is a polymer composition comprising a styrene/acrylonitrile copolymer and a diene rubber substrate with styrene and acrylonitrile grafted thereon.

3. The polymer composition of claim 1 which comprises from 2 to 8 percent by weight of potassium carbonate.

4. The polymer composition of claim 1 in which the amounts of alkali metal carbonate and cupric oxide are substantially equal.

5. A polymer composition comprising a copolymer of styrene and acrylonitrile and from 2 to 8 percent by weight based on the copolymer weight of each of cupric oxide and potassium carbonate.

* * * * *